United States Patent Office 3,340,467
Patented Sept. 5, 1967

3,340,467
MAGNETIC METAL DETECTOR UTILIZING A MAGNETIC BRIDGE FORMED WITH PERMANENT MAGNETS AND A HALL EFFECT SENSOR
In Whan Ha, La Habra, Calif., assignor to Beckman Instruments, Inc., a corporation of California
Filed June 23, 1964, Ser. No. 377,235
3 Claims. (Cl. 324—41)

The present invention relates to apparatus for detecting the presence of magnetic metals and more particularly to apparatus using a Hall effect device for sensing changes in magnetic fields due to the presence of a magnetic body.

At times, especially in the construction industry, it is desirable to locate the position of magnetic bodies, such as pipes, rods, or conduits which are buried in concrete or in the earth, covered by wood, or otherwise hidden. In some instances, it is also desirable to determine the particular orientation of rods, pipes, conduits or other magnetic bodies before attempting to uncover them. Various types of magnetic pointers and electrical field detection devices have been devised in the past. However, most of these devices have been unwieldy and of low sensitivity. Many of the devices merely indicate the presence of a magnetic member and have no means for directly pointing out the particular orientation of the rod or pipe in its buried location.

The presence of a magnetic member in the vicinity of a magnetic field generating device or magnet can change the characteristics of the field and increase or decrease the magnetic field strength in portions of the magnetic circuit depending upon the shape of the magnetic member. A Hall effect device may be utilized to detect changes in field strength within a magnetic circuit due to the presence of a magnetic body or material in the flux field generated by a magnet or solenoid. While all metals exhibit Hall effect to some extent when subjected to a magnetic field, certain semiconductors such as indium arsenide and indium antimonide exhibit greater Hall effect characteristics and are extremely sensitive to changes in magnetic field. The application of a magnetic flux field in a transverse direction across a Hall effect generator formed of a thin plate or film of such semiconductor material produces a deflection of a control current through such film or plate which is normal to both the applied fields and to the current flow. This deflection of current creates a difference in potential or Hall voltage which appears across the opposite edges of the plate and which is proportional to the product of the current and magnetic flux. Changes in the magnetic flux field due to the presence of a magnetic material or body in the vicinity of the magnetic circuit may be reflected in the voltage output of the Hall plate or generator.

Accordingly, it is an object of the present invention to provide an improved magnetic material detector using a Hall effect generator to provide an extremely sensitive magnetic sensing device.

It is another object of the present invention to provide an improved magnetic detector using a Hall effect generator which may be used to provide an indication of the orientation of a buried longitudinal body of magnetic mataerial, such as a rod or pipe.

It is a further object of the present invention to provide an improved device for locating the position of magnetic bodies that is extremely sensitive with extremely low power requirements.

Further objects and advantages of the invention will become apparent as the following description proceeds, and the features of novelty which characterize the invention will be pointed out with particularity in the claims annexed to and forming a part of this specification.

In carrying out the objects of the present invention in accordance with one important aspect thereof, there is provided a magnetic bridge circuitry comprising a closed magnetic loop and a substantially open magnetic loop each including as a part thereof a common path or core through which the normal flux field of the respective loops is substantially equal in magnitude and opposite in direction thereby making the normal effective flux field in the common path substantially equal to zero. A Hall effect voltage generator is positioned in the common path of the magnetic bridge circuitry and means are provided for applying a control current to two opposite sides of the Hall generator and voltage indicating means is connected across the output or Hall voltage terminals of the generator. At least one of the magnetic loops is provided with a substantial gap therein creating a greater magnetic reluctance in this magnetic loop than in the other loop so that, when the gap of this loop is disposed in the vicinity of a magnetic material, there is a reduction in the reluctance of the magnetic loop and a corresponding increase in the flux magnitude through the common path of the bridge circuitry thereby causing a voltage change across the Hall voltage terminals proportional to the product of the control current and the change in the flux field in the common path through the bridge circuitry.

For a better understanding of the invention, reference may be had to the accompanying drawings in which.

Figure 3:
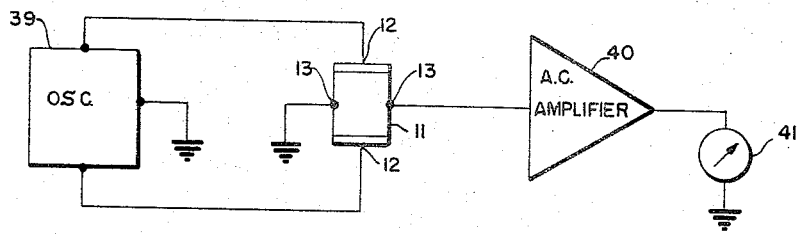
Figure 4:
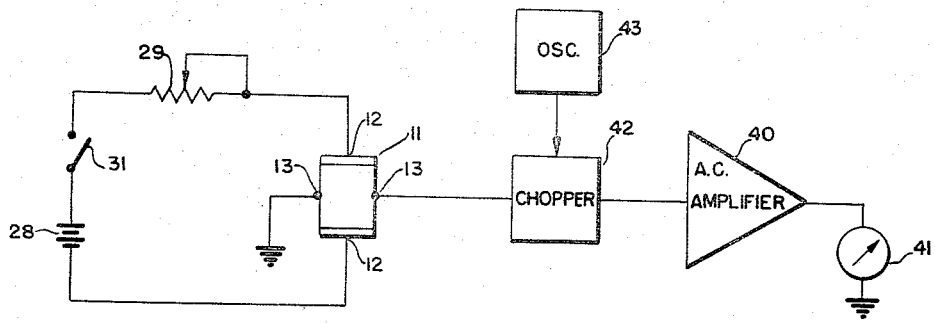

FIG. 3 is a line diagram illustrating another embodiment of the invention in which the control current input to the Hall generator is a pulsation or alternating current with the output of the generator being appropriate for amplification with an A.C. amplifier; and FIG. 4 is a line diagram illustrating another embodiment of the invention in which the control current to a Hall generator is a direct current and the output is converted into an alternating current or pulsating signal which may be appropriately amplified for greater sensitivity of readout.

Figure 1:
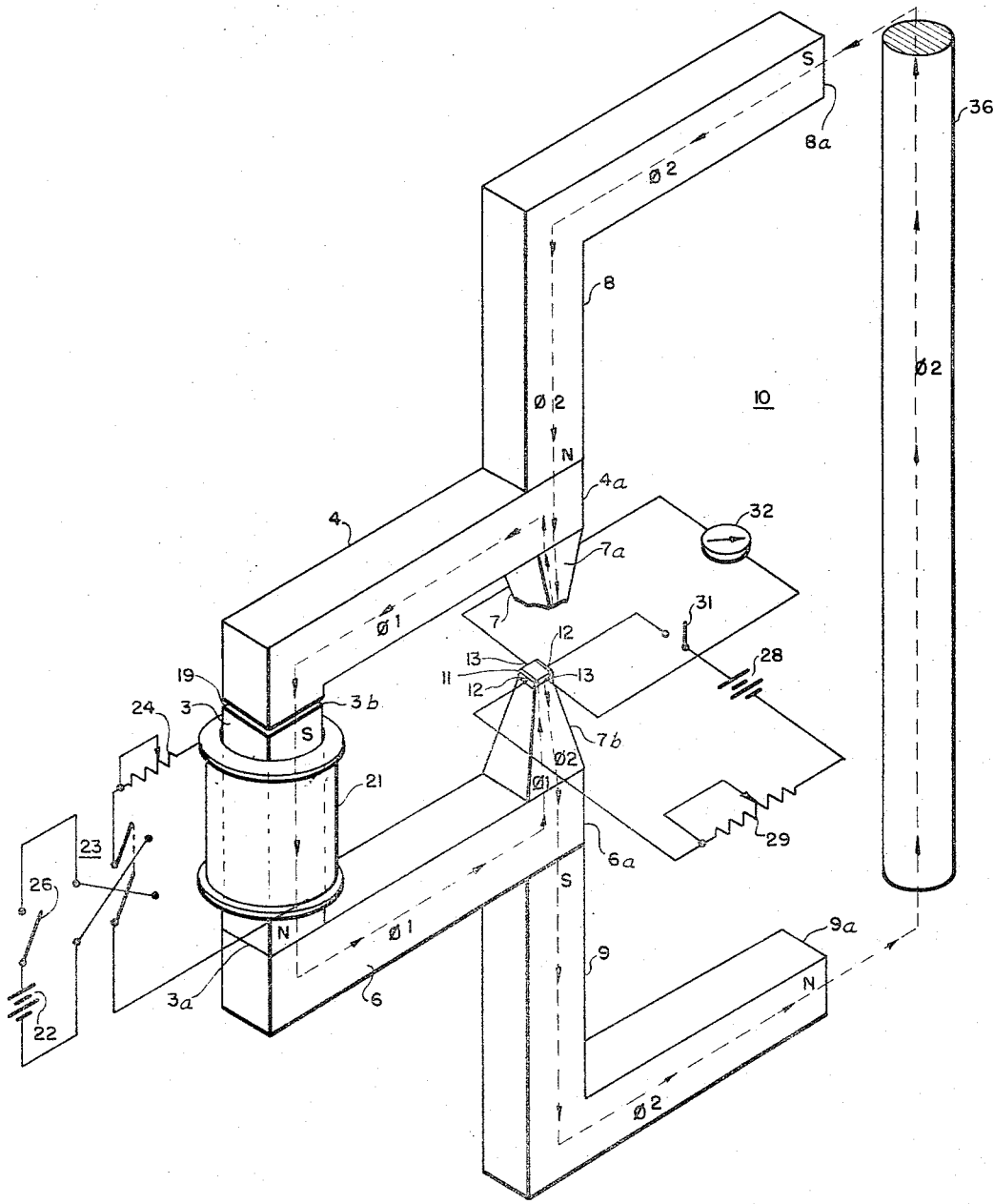
FIG. 1 is a perspective view of the magnetic bridge circuit and the associated electrical circuitry of one embodiment of the invention.

Referring now to FIG. 1, there is shown a preferred form of the detector comprising a magnetic bridge circuit including a first magnetic loop or circuit that is substantially closed and a second magnetic loop or circuit having a substantial gap or space between opposite pole faces thereof. The first loop, in FIG. 1, includes the permanent magnet member 3, having north and south poles arranged on its opposite respective ends thereof, and legs 4 and 6 which may be composed of soft magnetic materials exhibiting qualities of low retentivity together with high permeability. Legs 4 and 6 of the first or substantially closed magnetic loop provide a path for the magnetic flux created by the permanent magnet 3 and connect respectively with a common core or common path 7 of soft high permeability magnetic material, which forms a common path between the first and second magnetic loops. The common core 7 includes a pair of tapered soft permeable sections 7a and 7b, the shape of which serves to concentrate the flux through the common core 7 of the respective magnetic bridge loops.

The second magnetic loop or circuit includes the common path or core 7 and a pair of L-shaped legs 8 and 9 abutting respectively the legs 4 and 6 of the first magnetic circuit and directly in alignment with the common core 7. Legs 8 and 9 are permanent magnets having north and south pole faces in alignment with the core. The remaining portion of the second loop includes a gap 10 disposed between opposite ends or pole faces 8a and 9a respectively of the legs 8 and 9. Permanent magnets 3, 8 and 9 must have a high resistance to demagnetization as well as a strong coercive force. A magnet formed of a material, such as the well-known Alnico magnetic alloys which strongly resist demagnetization, may be employed.

Arranged within a small gap between the tapered sections 7a and 7b in the common core 7 is a Hall generator 11 which is arranged substantially normal to the flux path or core 7. Hall generator 11 comprises a thin film of semi-conductor material, such as indium antimonide (InSb) or indium arsenide (InAs), vacuum deposited on a slab of ferrite or other suitable substrate material. Hall generator or plate 11 is provided with a pair of input terminals 12 and Hall voltage output terminals 13 connected respectively to opposite sides of the semiconductor film deposited on the substrate. Preferably the Hall generator may be formed of any of the well-known semiconductor materials, such as indium antimonide or indium arsenide in the form of a thin film deposit of semiconductor material on a nonconductive base plate or ferrite plate according to the methods set forth in the French et al. Patent No. 3,084,124, issued Mar. 19, 1963, and assigned to the same assignee as the present invention.

As will be seen in FIG. 1, permanent magnet 3 produces a magnetic flux, represented by the dotted lines $\phi 1$ in a closed loop from north pole 3a, through member 6, the common core 7, member 4 to the south pole and 3b of permanent magnet 3. Flux field $\phi 1$ is directed in the upward directions through the common core 7 and through the Hall plate 11 disposed therein. Magnetic members 8 and 9 produce a flux $\phi 2$ in the common core 7 which is opposite in direction and of substantially the same magnitude as flux $\phi 1$. Because of the gap 10 in the second or open magnetic circuit, magnets 8 and 9 must be substantially greater strength than magnet 3 in order to provide a flux field of substantially the same magnitude as flux field $\phi 1$ through the common core 7 of the magnetic bridge. Flux field $\phi 2$ is also applied through the Hall generator 11 and is illustrated by the dotted lines and arrows designated $\phi 2$ represented in the second magnetic loop.

Most of flux field $\phi 1$ generated by magnet 3 passes through the central core 7 rather than through the second loop formed by the magnetic members 8 and 9 and gap 10 because the reluctance of gap 10 is much larger in comparison to the reluctance of the gap in core 7 for the Hall generator 11 and similarly, most of the flux field $\phi 2$ passes through the common core 7 because the reluctance of the central or common core 7 is substantially less than the reluctance through the legs 4 and 6 and magnet 3 of the first loop or substantially closed circuit. It will be noted that the first loop is preferably provided with a gap 19 which increases the reluctance through this loop to a magnitude greater than the reluctance through the common core 7. That is, the air gap 19 in the first loop is greater than the gap provided in the central core 7 of the Hall effect element 11 and, therefore, most of the flux field produced by magnets 8 and 9 passes through the common core 7 rather than assuming a path around portions of the first loop.

The two magnetic circuits are designed so that flux fields $\phi 1$ and $\phi 2$ through the central core 7 are substantially equal in magnitude but opposite in direction and, thus, oppose and cancel each other in the central core 7. By varying the width of the gap 19 during construction of the device, a rough zeroing of the flux through the Hall generator may be realized. It is also desirable to provide means for making fine adjustments in the flux field $\phi 1$ in order to make it more closely equal but in opposite direction to flux field $\phi 2$. For this purpose, means are provided for increasing or decreasing the magnetic flux in the first magnetic loop. In the illustrated embodiment of FIG. 1, these means comprise D.C. winding or coil 21 which may be connected in series across a battery 22 through a reversing switch 23 and a variable resistance device 24. A switch 26 is designed to complete the circuit through the coil 21. Reversing switch 23 makes it possible to add or subtract the ampere turns of the coil 21 in order to add or subtract magnetic flux to the magnetic loop. The variable resistor 24 provides fine adjustment for increasing or decreasing the current through the coil 21 thereby permitting precise adjustment of the ampere turns of the coil 21 to add or subtract from the flux field $\phi 1$ through the first loop thereby to make it exactly equal in magnitude to the flux $\phi 2$ in the second loop so that the normal net field flux through the column core 7 is zero.

Means are provided for applying a control current across the input electrode 12 of the Hall generator 11. In the embodiment shown in FIG. 1, these means comprise a battery 28 arranged in series with a variable resistance device 29 and a switch 31 connecting with opposite sides or terminals 12 of the Hall generator. Closing switch 31 allows control current to flow through the Hall generator and the magnitude of this current may be controlled by varying the resistance of the circuit through the variable resistance device 29.

Means, connected to the Hall output terminals 13 of the Hall generator 11, are provided for detecting any voltage across the Hall plate. While many voltage detection devices may be employed for this purpose, it is preferable to provide an indicating means which gives an output signal that is proportional to the magnitude of Hall voltage output of the generator 11. In FIG. 1, meter 32 is designed to measure the magnitude of the output voltage across the Hall generator and so indicate the magnitude with a suitable pointer.

As previously stated, under normal circumstances when the apparatus is not disposed closely adjacent any strong external field or highly permeable material, the net flux field in the common core 7 is designed to be essentially zero. This, of course, can be adjusted to zero by means of the aforedescribed fine adjustment means controlling the flux $\phi 1$ through the first loop. When the effective flux field through the common core 7 is zero, the voltage output of the Hall generator 11 is zero since the output of a Hall device is proportional to the product of the applied control current and the applied magnetic flux field across the Hall plate. When a body of iron or other magnetic material, such as the rod 36, is disposed in the vicinity of the gap 10 of the magnetic bridge circuit, the body provides a path of reduced magnetic reluctance for the flux field generated by magnetic members 8 and 9 and greatly increases the magnetic flux field $\phi 2$ in this loop. The first or closed loop of the magnetic bridge is virtually unaffected by the magnetic material because this branch is already closed magnetically with a much smaller air gap 19 than that of the second loop. A difference between the respective fluxes $\phi 1$ and $\phi 2$ will appear, and the difference will, of course, create a net magnetic field through the Hall generator 11. This net field is dependent upon the depth, permeability, size and state of magnetization of the magnetic body or other material detected. The Hall generator 11 then generates a voltage output that is proportional to the control current applied and the increased or changed flux field ($\phi 1 - \phi 2$) and this voltage is indicated on the meter 32.

In order to ascertain the orientation of a longitudinal member such as a rod or pipe under a cement or earth surface, the apparatus is merely rotated about an axis passing between the north and south pole ends 9a and 8a. As the poles 8a and 9a become aligned with the rod or pipe, the meter 32 gives a maximum output indication. Furthermore, by translationally moving the detection device, the exact position of the rod can be located beneath a covering nonmagnetic material. Because the gap 10 is substantially great and the north and south poles or ends 9a and 8a respectively of the device are widely separated, the device is especially sensitive in determination of the orientation of longitudinal members. While this is the preferable structure, it will be understood that the members 8 and 9 may be formed in other configurations and still provide an extremely sensitive magnetic material detection device. For example, the members 8 and 9 could be made straight instead of L-shaped with their north and south poles 8a and 9a respectively abutting the ends 4a and 6a of the legs of the first loop. In such an instance the separation between the north and south pole end 8a and 9a of the second loop would not be as great and the gap 10 would be substantially less. While such a device would still operate to indicate the relative position of magnetically detectable bodies, it would be somewhat less sensitive to the particular orientation of longitudinal bodies.

Figure 2:
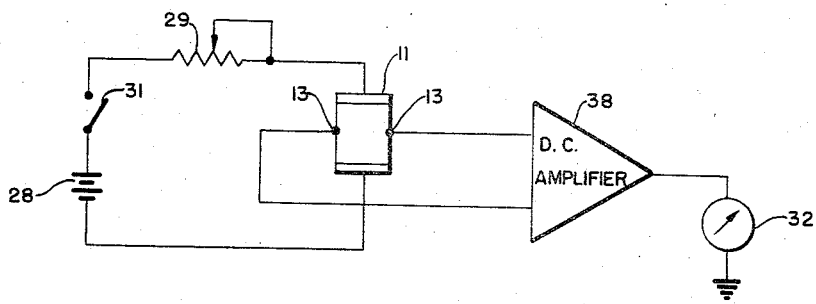
FIG. 2 is a line diagram of a more sensitive readout arrangement for the Hall voltage generator using direct current input and output.

The sensitivity of this D.C. operated device can be greatly increased by the addition of a D.C. amplifier between the output of terminals of the Hall generator. For example, as may be seen in FIG. 2, a D.C. amplifier 38 may be driven by the output voltage across the Hall generator terminals 13 to amplify the output signal. The output of the D.C. amplifier 38 is applied to a D.C. meter 32 which is, in turn, connected to ground.

Alternative embodiments of the invention are shown in FIGS. 3 and 4, which permit the use of the less expensive A.C. amplifier for readout purposes. In FIG. 3, the control current to the Hall generator 11 is applied through terminals 12 by means of oscillator 39 which provides a constant amplitude output at a relatively low frequency. The output of the Hall generator 11 is fed into an A.C. amplifier 40 for suitable amplification and the output of the amplifier 40 is applied to an A.C. meter 41 that is connected to ground. Very small increases in field flux through the central core 7 and the resultant minute Hall voltage output can be amplified by this apparatus to provide extremely sensitive apparatus.

FIG. 4 illustrates another embodiment for amplifying the electrical output of the Hall generator. In this embodiment, the Hall generator is again controlled by a suitable D.C. input current from a battery 28. A switch 31 and variable resistance device 29 permit control of the amplitude of the input current. The output of the Hall generator 11 is fed into a suitable chopper 42 which receives a chopping signal from an oscillator 43. The D.C. output from the Hall generator is converted by the chopper into a signal with an A.C. characteristic which may then be amplified by an A.C. amplifier 40, as in the embodiment described above with respect to FIG. 3. The output of the amplifier is then read by a suitable A.C. meter 41 to indicate the location of a magnetic member.

While a meter has been utilized for the purpose of indicating output, it will be understood that other means may be employed separately or in conjunction with the meter for such purposes. For instance, sound reproducing equipment, such as earphones, may be used, i.e., since the frequency of operation may be in the audio range, the amplitude of the audio signal will be representative of the location of a magnetic rod. Furthermore, while permanent magnets 3, 8 and 9, as described in the illustrated embodiment, provide an extremely simple and portable means for producing the flux fields of the respective loops, it will be understood that suitably controlled electromagnetic flux field generating devices can easily be substituted for these permanent magnets in the apparatus.

While in accordance with the patent statutes there has been described what at present is considered to be the preferred embodiment of the invention, it will be understood by those skilled in the art that various changes and modifications may be made therein without departing from the invention, and it is, therefore, the aim of the appended claims to cover all such changes and modifications as fall within the true spirit and scope of the invention.

What is claimed is:

1. Apparatus for detecting the presence of magnetic members comprising:
    a magnetic bridge circuit including a first magnetic loop formed of at least one permanent magnet member and a plurality of interconnected ferromagnetic members arranged in a substantially closed loop, said ferromagnetic members being formed of a material having high magnetic permeability but low retentivity;
    a second magnetic loop formed of at least a pair of permanent magnetic members having north and south poles respectively disposed in alignment with one ferromagnetic member that is common to both said first and second magnetic loops, said second magnetic loop having a gap therein creating a greater magnetic reluctance in said second magnetic loop than the magnetic reluctance of said first magnetic loop, said magnetic members of said respective magnetic loops being so constructed and arranged as to produce substantially equal and opposite magnetic flux through said common member thereby making the normal effective flux field in said common member substantially equal to zero;
    a Hall voltage generator positioned in said flux field of said common ferromagnetic member, said Hall generator including means for applying a control current thereto and Hall voltage output terminals; and
    means connected to said Hall voltage terminals for indicating a voltage output from said Hall generator when a magnetic member is disposed in the vicinity of said gap in said second magnetic loop thereby reducing the reluctance of said second magnetic loop and producing a corresponding increase in flux field magnitude through said common member and a Hall voltage output corresponding to the relative position of said magnetic member with respect to said gap in said second magnetic loop.

2. The apparatus for detecting the presence of magnetic members in accordance with claim 1 wherein said common ferromagnetic member is formed of a pair of oppositely tapered members of high magnetic permeability and low retentivity gradually reducing in cross-sectional area towards said Hall voltage generator disposed therebetween, said tapered members concentrating the flux field flowing therethrough in the region of said Hall voltage generator.

3. Apparatus for detecting the presence of magnetic members comprising:
    a magnetic bridge circuit including a first magnetic loop formed of a plurality of interconnected bar members arranged in a substantially "O" shaped closed loop, a second magnetic loop formed of a pair of spaced apart magnetic bar members extending outwardly from one side of said first loop, said one side of said first loop forming a common flux path for both said first and second loops, said spaced apart magnetic members terminating with north and south poles respectively disposed adjacent a relatively large air gap creating a greater magnetic reluctance in said second magnetic loop than the magnetic reluctance of said first magnetic loop;
    means for inducing magnetic flux fields in said respective loops, said means permitting adjustment of the magnitude and direction of the flux fields in said magnetic loops so that said fields are substantially equal in magnitude and opposite in direction through said common flux path thereby making the normal effective flux field through said common path equal to zero;
    a Hall voltage generator positioned in said flux field of said common flux path, said voltage generator including means for applying a control current thereto and Hall voltage output terminals; and means connected to said Hall voltage terminals for indicating a voltage output from said Hall generator when a body of magnetic material is disposed in the vicinity of said gap in said second magnetic loop thereby reducing the reluctance of said second magnetic loop and producing a corresponding increase in the flux field magnitude through said common flux path and a Hall voltage output corresponding to the relative position of said body of magnetic material with respect to said gap in said second magnetic loop.

References Cited

UNITED STATES PATENTS

| 1,966,984 | 7/1934 | Lichtenberger et al. | 324—37 |
| 2,992,369 | 7/1961 | La Rocca | 324—41 |
| 3,060,370 | 10/1962 | Varterasian | 324—45 |

RUDOLPH V. ROLINEC, *Primary Examiner.*

RICHARD B. WILKINSON, WALTER L. CARLSON,
*Examiners.*

R. J. CORCORAN, *Assistant Examiner.*